Feb. 15, 1955 W. E. DIEFENDERFER 2,702,215
TURBINE LUBRICATING SYSTEM
Filed July 10, 1951

INVENTOR
WILLIAM E. DIEFENDERFER
BY *Leonard F. Weklind*
ATTORNEY

United States Patent Office 2,702,215
Patented Feb. 15, 1955

2,702,215

TURBINE LUBRICATING SYSTEM

William E. Diefenderfer, Wethersfield, Conn., assignor to United Aircraft Corporation, East Hartford, Conn., a corporation of Delaware Application July 10, 1951, Serial No. 236,029

3 Claims. (Cl. 308—187)

This invention relates to lubricating mechanism and particularly to a lubricating device utilizing a wick feeder.

Wick oilers have previously been user for supplying oil to plain or sleeve bearings but have had the disadvantage of feeding oil while the bearing was not operating so that an oversupply of oil would be present when the bearing was again started and because of the continuous feeding of the oil, the oil container would require frequent replenishment.

Wicks feeding from grease filled containers, i. e. containers holding a mixture of soap and oil, in the past would either continuously feed the oil from the grease or would feed the oil from the grease adjacent the wick, leaving a hard deposit of soap through which the oil would not penetrate.

Bearings lubricated directly by a grease and particularly a grease which discharges the oil at an elevated temperature are normally slow speed bearings in which the temperature is low enough so that the oil and soap do not separate. If the bearing becomes hot enough so that the oil and the grease tend to separate, the oil may be leached from the grease in the hot bearing and the remaining soap is not adequate as a lubricant.

If an oil bleeding grease is used in a reservoir connected to the bearing by a small orifice of some sort, the oil will bleed from the grease reservoir in the immediate neighborhood of the orifice leaving a collection of a hard soap residue in this area which prevents further passage of the oil from the grease to the bearing.

In the construction involving this invention, provision is made for the utilization of grease for lubrication of an extremely high speed anti-friction bearing. In general this is accomplished by feeding the oil from an oil bleeding grease by means of a wick uniformly dispersed throughout a grease in which the oil and soap separate at a reservoir temperature slightly below operating temperature of the reservoir but well above the normal ambient temperature so that oil in the correct proportion flows through the wick to the bearing to lubricate it when the structure is at operating temperature but when the unit is not operating and the reservoir temperature returns to ambient, the soap solidifies and binds the oil to prevent flow so that the supply of oil is greatly reduced or even shut off from the bearings.

An object of this invention is to automatically lubricate an anti-friction bearing.

A further object is to provide structure which will automatically prevent overlubrication of a bearing when it is not operating but provides adequate lubrication when it is operating.

A further object is to provide an efficient bearing lubricating system for a high speed type of bearing which will provide aqequate lubrication over a long period of time without requiring attention from an operator.

Other objects and advantages will be apparent from the following specification and the attached drawings in which, Fig. 1 is a sectional view through a structure incorporating the bearing lubricating device.

Figure 1:
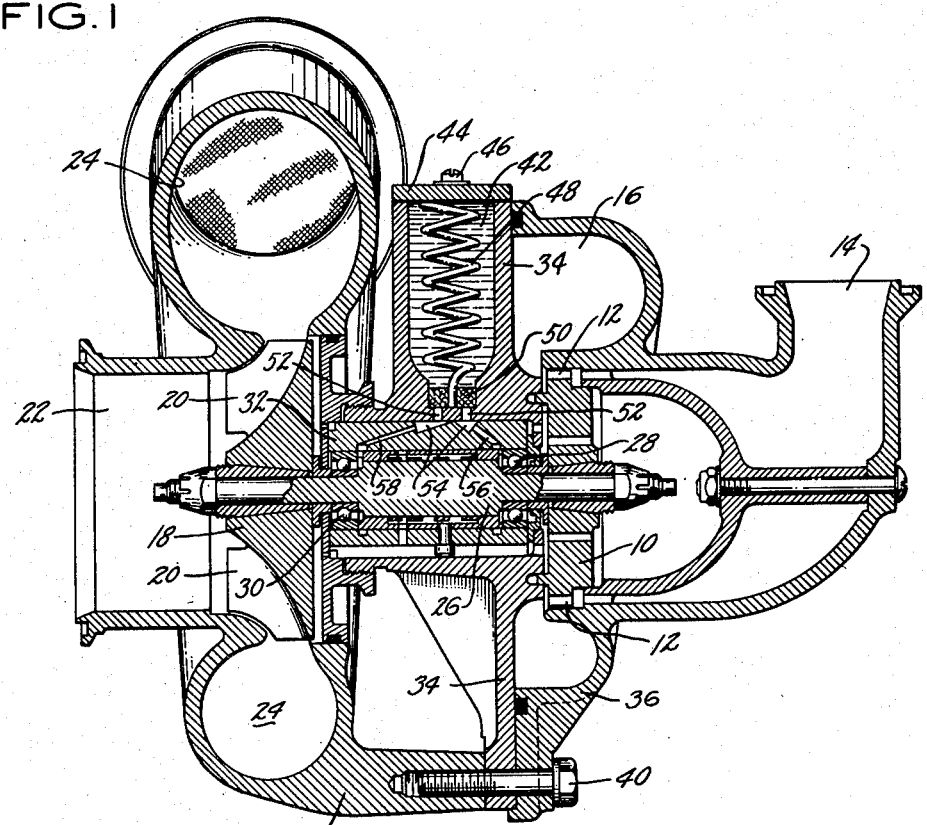
Figure 2:
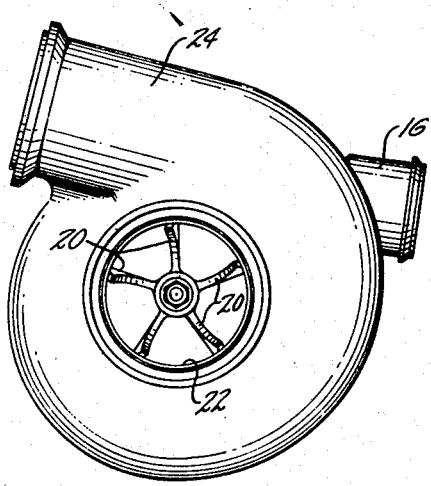
Fig. 2 is an end view looking at the lefthand end of the structure as seen in Fig. 1.
Figure 3:
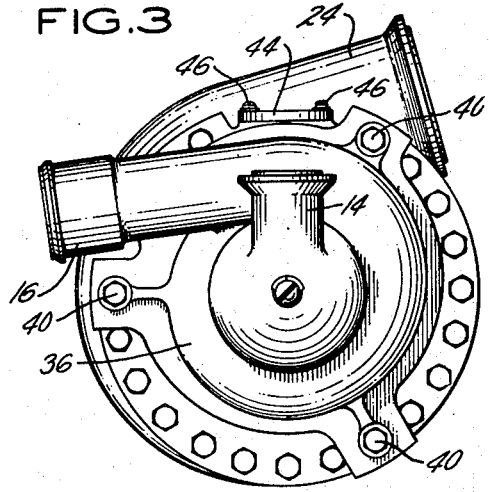
Fig. 3 is an end view looking at the righthand end of the structure as seen in Fig. 1.

In the embodiment selected for illustrating the invention, a refrigerating unit used in the air conditioning systems of high speed airplanes is illustrated. This device consists primarily of a turbine 10 having blades 12 driven by air usually at an elevated temperature introduced through an air inlet 14 and discharged at a reduced temperature through the outlet 16. The turbine rotor drives an impeller 18 having blades 20 drawing air through an inlet 22 and discharging it at an elevated temperature through the discharge 24.

The turbine rotor 10 and the impeller 18 are supported on opposite ends of a shaft 26 which in turn is supported on spaced ball bearings 28 and 30. Bearings 28 and 30 are supported in a sleeve 32 mounted in a housing 34 and located between the discharge housing of the turbine and the compressor. Housing 34 which is essentially a flat disc with a bearing supporting boss formed in the center thereof is secured in position between the turbine housing 36 and the compressor housing 38 by means of a series of cap screws 40 connecting the three elements.

Formed integral with the housing 34 is a substantially cylindrical grease reservoir 42 having a removable cap 44 secured by cap screws 46. A wick 48 which may be an elongated stringlike member of felted, woven or stranded fibrous material usually round in cross section is coiled in the grease reservoir 42 in such a manner that no portion af the grease is at a greater distance from the wick than that through which the oil may be bled from the grease; in other words, the wick is uniformly distributed through the grease reservoir. In practice, this has been found, with the wick and grease used, to be about one-quarter of an inch. One end of this wick is inserted into and held in intimate contact with a felt pad or washer 50 located in a recess in the bottom of the grease reservoir. A series of holes 52 lead from the under side of this felt pad to an oil collecting trough 54 from which the oil is led by gravity through passages 56 and 58 to ball bearings 28 and 30.

The wick is coiled in the reservoir at the time the reservoir is filled with grease. A grease such as Part No. M.34 sold by Master Lubricants Company, Philadelphia, Pennsylvania, comprising an intimate mixture or emulsion of a lime-soda base soap and oil is used. This mixture has the property of bleeding oil from the soap at elevated temperatures such as 180° to 200° F. but at an ambient temperature under 100° to 120° F., the mixture congeals so that the oil is retained in and does not bleed at all or at most very slowly from the soap. I have found that a satisfactory grease is one which will bleed about .7 percent of the oil in 100 hours at 70 F. and bleed about 8 percent of the oil in 100 hours at 250° F. Oil bleeding from the grease is absorbed by the wick 48 and led to the felt washer 50 by capillary action where it is uniformly distributed to the holes 52 and hence to the bearings 28 and 30. At the lower ambient temperatures, the flow and the feeding of oil stops or greatly reduces and the oil is retained in the grease until the temperature is again raised and thus flooding of the bearings during periods of idleness is prevented.

In a typical case for the device shown, air, at a temperature in the neighborhood of 600° F., is led from a compressor which may be the compressor of a gas turbine engine. This air is passed through a heat exchanger, emerges at a temperature of approximately 200°–250° F., passes into the inlet 14, and is expanded through turbine blades 12 where its temperature is reduced to the neighborhood of 20°–40° F. This turbine 10 drives the compressor 18 mounted on the opposite end of shaft 26 at a speed of approximately 60,000 R. P. M. to absorb the energy from the compressed air led in the inlet 14 and expanded through the turbine. The air entering inlet 22 to the compressor is at a temperature of approximately 290° F.–320° F. having come from the other pass of the heat exchanger through which passes the air entering inlet 14. Temperature of the air passing through the compressor 18 is raised about 50° in the compressor emerging in the neighborhood of 340° F.–360° F. Air from the turbine outlet 16 and from the turbine inlet 14 may be combined in any desired ratio to provide the proper temperature in the airplane cockpit to which the air is supplied.

Due to the temperature of the air admitted to the inlet 14 and to the temperature of the air in the compressor outlet 24, the temperature of the housing of the unit and particularly the housing 34 is raised during operating periods to a temperature in the neighborhood of 180° to 200° F. which is sufficient to transform the grease in the grease container 42 to a condition in which the oil will bleed therefrom. This increase in temperature takes place in spite of the fact that the air at reduced temperatures from the turbine outlet is adjacent the intermediate housing 34. It will thus be seen that it is not the friction in the bearings themselves which produces this elevated temperature but it is rather the energy from the work done by the device and the energy in the air supply to the device that provides this heat.

It is well known that in high speed precision anti-friction bearings (as for example herein) where high speeds are encountered if the self-generated frictional heat were usd for bleeding oil from a grease the bearings would be on the way to self destruction before sufficient heat would be developed.

Applicant has provided with the above structure a lubricating system for extremely high speed bearings which will provide adequate lubrication for the bearings over a long period of operation and will prevent flooding of the bearings over a long period of idleness, thus reducing the necessity for frequent maintenance and providing a structure which requires no attention between the regular periodic overhauls.

While applicant has illustrated and described the preferred embodiment it will be appreciated that modifications may be made therein without departing from the spirit of the invention which is limited only by the scope of the appended claims.

What it is desired to obtain by Letters Patent is:

1. In a device having high speed anti-friction bearings and which operates at an elevated temperature, an oiling system for said bearings comprising, a container in heat exchange relation with the device and spaced from said bearings, means for heating said container, a bleeding grease in said container consisting of a fluid lubricant and a carrier for the lubricant, said grease being capable of bleeding lubricant at a maximum rate at an elevated temperature and a minimum rate at ambient temperatures, a wick uniformly distributed throughout said grease and conducting lubricant by capillary action therethrough, an outlet for said container, and means for conducting lubricant from said wick to said outlet comprising gravity feed mechanism leading to said bearings for distributing said lubricant to said bearings.

2. In a device according to claim 1 wherein said anti-friction bearings are ball type bearings.

3. In a device according to claim 1 wherein said grease is capable of bleeding lubricant at a maximum desirable rate in a range of temperature between 180° F. and 200° F. and bleeding at a minimum rate at ambient temperatures.

References Cited in the file of this patent

UNITED STATES PATENTS

| | | |
|---|---|---|
| 746,243 | Baggaley | Dec. 8, 1903 |
| 1,667,807 | Johnson | May 1, 1928 |
| 1,898,880 | Leis | Feb. 21, 1933 |
| 2,451,124 | Smith | Oct. 12, 1948 |
| 2,516,567 | Hamm | July 25, 1950 |
| 2,606,501 | Dreibelbis | Aug. 12, 1952 |